US011709724B2

(12) United States Patent
Aghajanyan et al.

(10) Patent No.: US 11,709,724 B2
(45) Date of Patent: *Jul. 25, 2023

(54) DISTRIBUTED APPLICATION EXECUTION FOR CLOUD COMPUTING

(71) Applicant: Microsoft Technology Licensing, LLC, Redmond, WA (US)

(72) Inventors: Souren Aghajanyan, Bellevue, WA (US); Jayaram N M Nanduri, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/747,187

(22) Filed: May 18, 2022

(65) Prior Publication Data

US 2022/0276918 A1 Sep. 1, 2022

Related U.S. Application Data

(63) Continuation of application No. 16/898,026, filed on Jun. 10, 2020, now Pat. No. 11,366,709.

(51) Int. Cl.
*G06F 7/38* (2006.01)
*G06F 9/54* (2006.01)
*G06F 16/22* (2019.01)

(52) U.S. Cl.
CPC .............. *G06F 9/547* (2013.01); *G06F 9/542* (2013.01); *G06F 16/22* (2019.01)

(58) Field of Classification Search
CPC .......... G06F 9/547; G06F 9/542; G06F 16/22; G06F 21/6218; G06F 21/44; H04L 67/10
See application file for complete search history.

(56) References Cited

U.S. PATENT DOCUMENTS

| 9,326,145 | B2 * | 4/2016 | Awan ................... H04L 63/101 |
| 2015/0012630 | A1 * | 1/2015 | Abuelsaad .......... H04L 41/0893 709/223 |
| 2016/0241633 | A1 * | 8/2016 | Overby, Jr. ............... G06F 9/50 |
| 2018/0084038 | A1 * | 3/2018 | Johnson .............. H04L 67/1023 |
| 2020/0137097 | A1 * | 4/2020 | Zimmermann ..... G06F 21/6218 |

* cited by examiner

*Primary Examiner* — Andy Ho
*Assistant Examiner* — Abdou K Seye
(74) *Attorney, Agent, or Firm* — Barta, Jones & Foley, PLLC

(57) ABSTRACT

Cloud computing techniques utilizing distributed application execution are disclosed herein. One example technique includes receiving a command to launch an application, and in response, determining an execution location corresponding to a type of data consumed by individual components of the application. Upon determining that one of the components is to be executed in a local computing facility, the example technique includes transmitting, from a public computing facility to the local computing facility, a request to execute the one of the components in the local computing facility instead of the public computing facility. Upon being authorized by the local computing facility, data is requested and received from the one of the components executed at the local computing facility without having direct access from the public computing facility to a data source at the local computing facility.

20 Claims, 9 Drawing Sheets

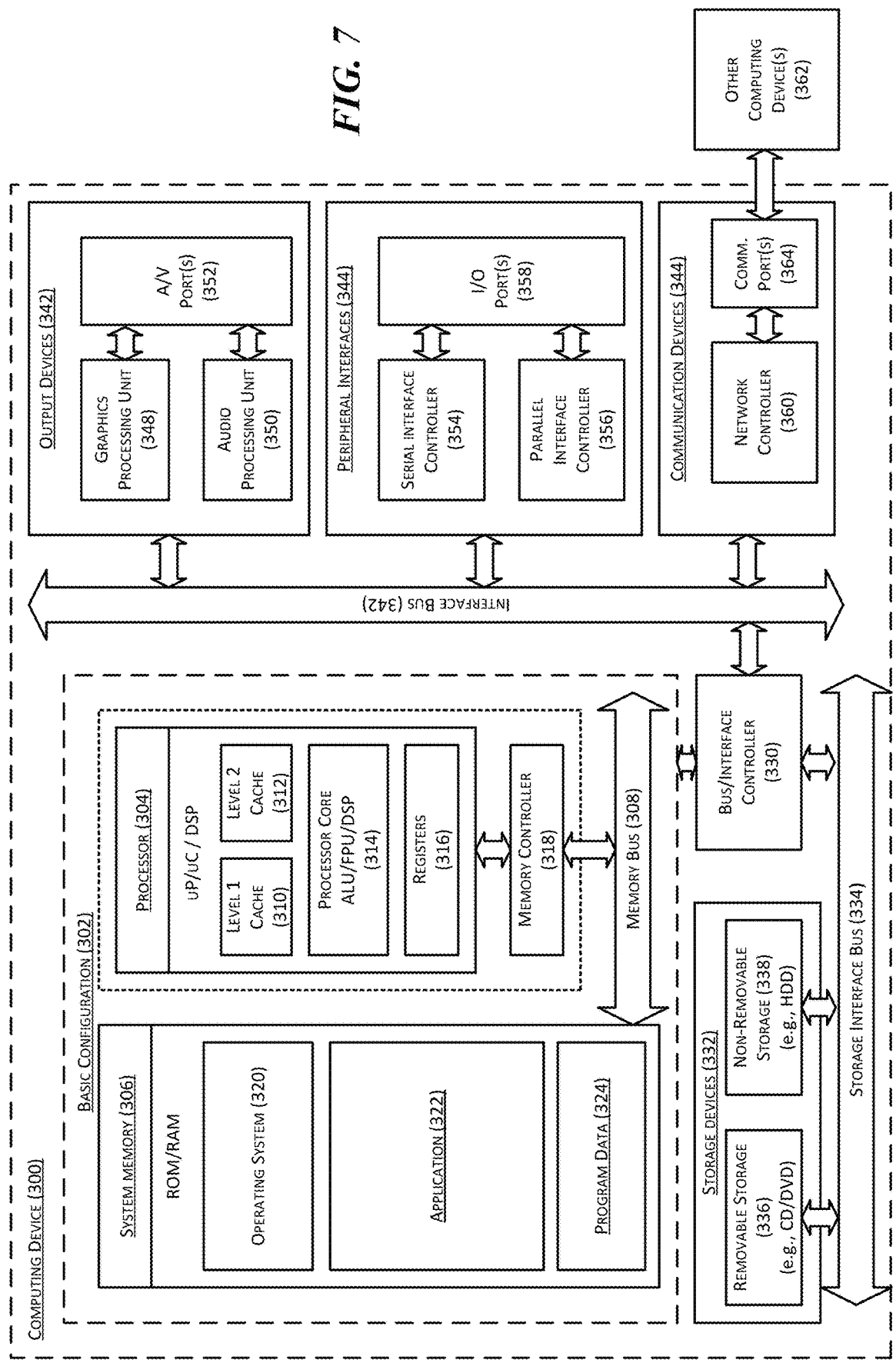

DISTRIBUTED APPLICATION EXECUTION FOR CLOUD COMPUTING

CROSS-REFERENCE TO RELATED APPLICATION(S)

This application is a continuation of and claims priority to U.S. patent application Ser. No. 16/898,026, filed on Jun. 10, 2020, now U.S. Pat. No. 11,366,709 the disclosure of which is incorporated herein in its entirety.

CROSS-REFERENCE TO RELATED APPLICATION(S)

This application is a continuation of and claims priority to U.S. patent application Ser. No. 16/898,026, filed on Jun. 10, 2020, the disclosure of which is incorporated herein in its entirety.

BACKGROUND

Remote or cloud computing systems typically utilize large numbers of remote servers housed in datacenters to provide compute, storage, network, or other computing services. The remote servers can be interconnected by computer networks to form one or more computing clusters. Each remote server in the computing clusters can host one or more virtual machines (VMs), containers, virtual switches, load balancers, or other types of virtualized components for resource sharing. During operation, virtualized components can facilitate execution of applications in the cloud to provide computing services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Cloud computing can be highly scalable while being low in initial capital investment. However, migrating certain applications from local execution to the cloud can be difficult when the applications consume data that a tenant is not willing to or cannot legally share with a cloud service provider. For example, a bank can have a ledger application that consumes personal identification, financial transaction, and other types of confidential data. The bank is legally required to exercise full control of such data and thus may not be willing or able to share such data with cloud service providers. Even when the bank is willing to share, the shared confidential data is typically obfuscated to such degrees that the data may lack usefulness. On the other hand, cloud service providers may not be willing to host such confidential data even when obfuscated because even a minor leak of such data can carry hefty penalties. As such, deployment of applications that consume confidential data of tenants to the cloud can be difficult.

Also, a tenant's strict control over or a lack of willingness to share confidential data can limit or even prevent deployment of certain applications that consume confidential data from multiple tenants. For example, an application may be developed to detect money laundering schemes by consume data of financial transactions from multiple banks in order to track money transfers of entities among multiple banks. In another example, an application may be developed to apply machine learning on detecting patterns of banking transactions among multiple banks in a financial market. However, one or more of the banks may not be willing to or even legally allowed to share such data, and thus rendering such applications inoperable.

Several embodiments of the disclosed technology can address certain aspects of the foregoing difficulties by implementing distributed execution of a cloud-based application in a computing framework based on types of data consumed by individual components of the application. In certain embodiments, the computing framework can include a cloud computing facility interconnected to a local computing facility via a computer network, such as the Internet. The cloud computing facility can be operated by a cloud service provider (e.g., Amazon.com) to provide various cloud computing services. The local computing facility can be under the control of a tenant subscribing to one or more cloud computing services provided by the cloud computing facility. In other embodiments, the computing framework can include additional cloud and/or local computing facilities and/or other suitable computing resources.

In one embodiment, when developing an application for execution in the cloud computing facility, a developer of the application can partition the application into multiple components based on types of data consumed by each of the components. For example, the application may be configured to generate a gift suggestion to a first user based on purchasing or browsing history data of a second user. When designing the application, the developer can partition the application into a first component interconnected to a second component via data exchange. The first component can be configured to receive input data from as well as providing output data to the first user. The second component can be configured to compile data of the purchasing or browsing history of the second user and produce one or more gift suggestions based on frequencies of purchasing, browsing, or other suitable criteria. As such, the first component can be configured to consume data from a first data source, i.e., input data from the first user while the second component can be configured to consume data from a second data source, i.e., data of the purchasing or browsing history of the second user.

Upon identifying the types of data to be consumed by the components of the application, the developer can further determine locations of such data for consumption by the components. In the example above, the developer can determine that the first data source can be located at the cloud computing facility while the second data source can be located on the local computing facility (e.g., a laptop computer of the second user). Upon identifying the locations of the first and second data sources, the developer can generate a metadata file for execution of the application. In one example, the metadata file can identify, for each of the components, a location of execution, data consumed as input, and data provided as output. Thus, in the example above, the metadata file can identify that request data is to be transmitted from the first component to the second component while suggestion data is to be transmitted from the second component to the first component. In other examples, the metadata file can also indicate a network location at which the various components may be retrieved as well as other execution characteristics, such as suitable runtime environment parameters.

Based on the metadata file, the computing framework can be configured to deploy various components of the application at the designated locations when the application is launched. For example, during initiation of execution, a server in the cloud computing facility can determine, based on the metadata file, that the first component is to be executed in the cloud computing facility while the second component is to be executed on the local computing facility. In response, the server in the cloud computing facility can be configured to transmit a request to the local computing facility for executing the second component of the application in such a way that all communications are semantically transparent to a trusted party (e.g., an administrator) at the local computing facility. In certain examples, the request can include identifications of types of data transmitted to and types of data received from the local computing facility. In other examples, the request can also include a syntax and verifiable semantics of data transfers between the cloud and local computing facilities. For instance, the request can identify that a first type of data is followed by a second type of data that is transmitted to/received from the local computing facility.

In accordance with aspects of the disclosed technology, the local computing facility can be configured to deploy a control layer between the first and second components executed at the cloud and local computing facilities, respectively. The control layer is configured to authorize, direct, monitor, and trace all communications between the various components of the application deployed at both the cloud and local computing facilities. During deployment, upon receiving the request from the cloud computing facility, the control layer can be configured to analyze the types of data received from and transmitted to the cloud computing facility and determine whether communication of the types of data are allowed based on policies configured at the local computing facility by the tenant. In the example above, the control layer can determine that transmitting suggestion data such as iPhone to the cloud computing facility complies with policies in the local computing facility. As such, the control layer can authorize execution of the second component in the local computing facility in order to provide the prescribed suggestion data to the cloud computing facility.

During operation, the first component can be executed in the cloud computing facility and request application data from the second component executed in the local computing facility. The control layer can be configured to receive, inspect, record, and route all communication between the first and second components executed at the cloud and local computing facilities, respectively. As such, components of the application executing in the cloud computing facility do not have a direct link to other components of the application executing in the local computing facility. For example, the control layer can be configured to receive data from the first component, determine whether such data is in accordance with the metadata file. Upon determine that the received data is in accordance with the metadata file, the control layer can forward the received data to the second component. Similarly, the control layer can be configured to received data from the second component designated to the first component and inspect the received data to determine whether the data complies with the metadata file and other policies of the tenant. Upon determining that the data complies with the metadata file and does not violate any policies of the tenant, the control layer can be configured to forward the data to the first component. Otherwise, the control layer can block or transform (e.g., via anonymization) the data from being transmitted to the first component, raise an alarm, or perform other suitable actions. The control layer can also record all events of such communications for archiving, auditing, or other suitable uses. In addition, the control layer can have full access to source code of at least a part of metadata file.

Several embodiments of the disclosed technology can thus allow consumption of confidential data of the tenant while allowing the tenant to maintain strict control over such confidential data. By partitioning an application into components based on the types of data the components consume, a developer can designate suitable execution locations at which the tenant can maintain strict control over the consumed data. By executing components that consume confidential data at a local computing facility, sharing of such confidential data with the cloud service provider can be avoided. Instead, the local computing facility only transmits non-confidential data to the cloud computing facility. As such, obfuscation of data for sharing with the cloud service provider as well as maintaining the obfuscated data by the cloud service provider can be avoided.

Several embodiments of the disclosed technology can also allow federated data analysis of confidential data from multiple tenants. For example, a model developer can be configured to develop a financial transaction model of multiple banks by partitioning the model developer into components executed in the cloud computing facility and multiple local computing facilities. Each local computing facility can be configured to analyze respective confidential data to produce a partition model that does not include any confidential data. Instead, the partition models can each include a pattern observed based on the confidential data. The model developer can then combine the various partition models to general an overall model without having access to the confidential data in the various local computing facilities.

BRIEF DESCRIPTION OF THE DRAWINGS

FIG. 7 is a computing device suitable for certain components of the distributed computing framework in FIG. 1.

DETAILED DESCRIPTION

Figure 1:
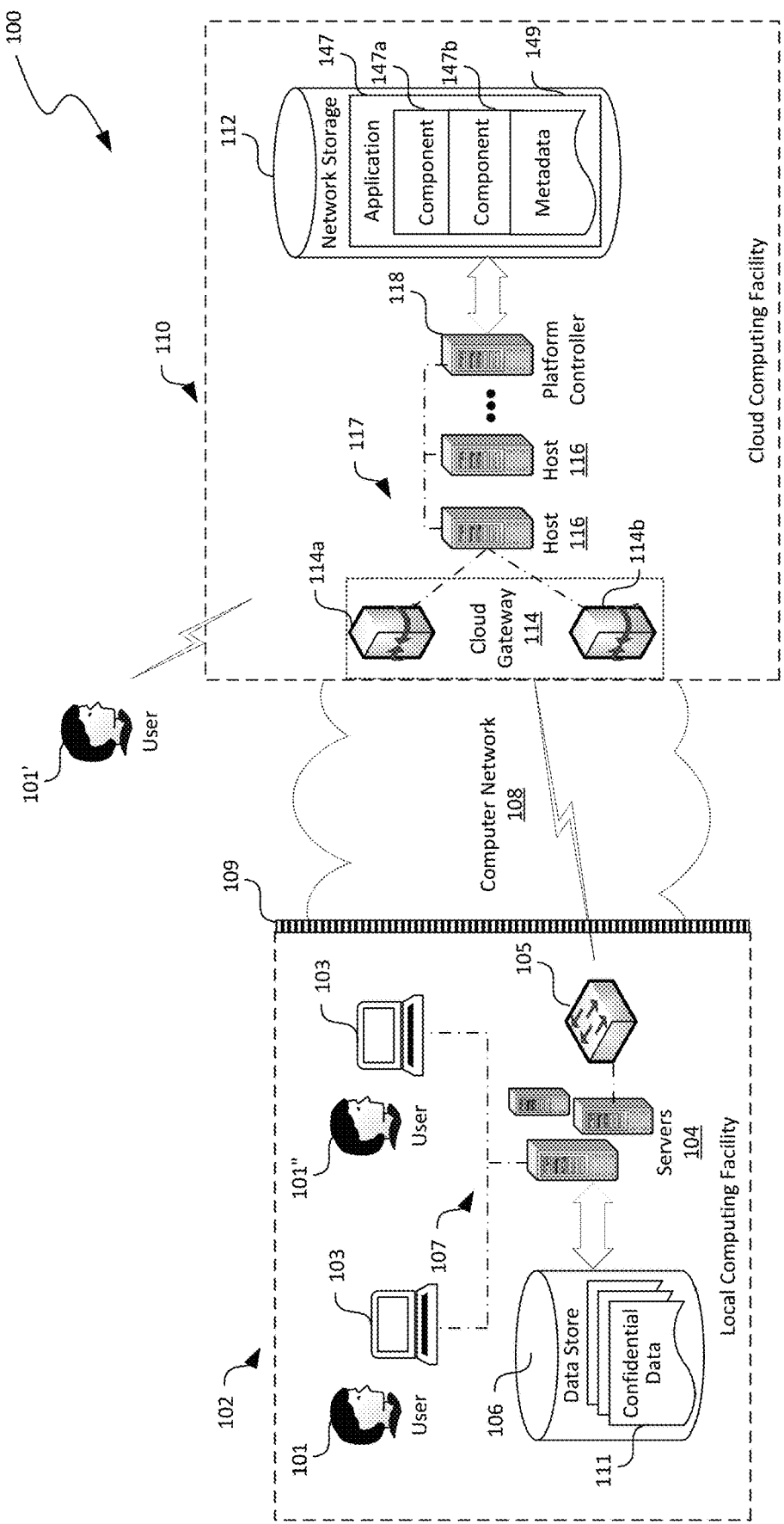
FIG. 1 is a schematic diagram of a computing framework implementing distributed application execution for cloud computing in accordance with embodiments of the present technology.

Certain embodiments of systems, devices, components, modules, routines, data structures, and processes for distributed application execution for cloud computing are described below. In the following description, specific details of components are included to provide a thorough understanding of certain embodiments of the disclosed technology. A person skilled in the relevant art will also understand that the technology can have additional embodiments.

The technology can also be practiced without several of the details of the embodiments described below with reference to FIGS. 1-7.

As used herein, a cloud computing facility or cloud refers to a computer system having a plurality of servers or hosts interconnected to one another or to external networks (e.g., the Internet) via a computer network with multiple network devices. Some of the servers or hosts can be located in, for example, different datacenters at diverse geographical locations. A cloud can be public when accessible to the general public or can be private when only accessible to members of an organization. A cloud computing facility can be provided by and under control of a cloud service provider. For instance, an example cloud computing facility can be a datacenter deployed and managed by a cloud service provider, such as Amazon.com of Seattle, Wash.

A network device can be a physical network device, examples of which include routers, switches, hubs, bridges, load balancers, security gateways, or firewalls, or a virtualized network device that is configured to share resources from a physical network device. A host can include a computing device configured to implement, for instance, one or more virtual machines or other suitable virtualized components. For example, a host can include a server having a hypervisor configured to support one or more virtual machines, containers, or other suitable types of virtual components. The one or more virtual machines or containers can be used to execute suitable applications or computer programs to provide desired cloud services.

A cloud computing service or cloud service can include various computing resources provided to users over a computer network, such as the Internet. Common examples of cloud services include software as a service (SaaS), platform as a service (PaaS), and infrastructure as a service (IaaS). SaaS is a software distribution technique in which software applications are hosted by a cloud service provider in, for instance, datacenters, and accessed by users over a computer network, such as the Internet. PaaS generally refers to delivery of operating systems and associated services over a computer network without requiring downloads or installation. IaaS generally refers to outsourcing equipment used to support storage, hardware, servers, network devices, or other components, all of which are made accessible over a computer network.

In contrast, a local computing facility can include a computer system having a plurality of servers, client devices, or other suitable types of devices interconnected to one another in a local area network with multiple network devices. For instance, an example local computing facility can include a local area network of a corporation, government agency, school, or other suitable types of entity. A local computing facility can be under the control of such an entity and at least partially isolated from a public network, such as the Internet, with a security boundary. The security boundary can be configured to grant access to various devices or data stored in a local computing facility based on an access control list (ACL). As such, only when a user is authorized, a local computing facility can grant the user permission to access certain device and/or data stored in the local computing facility. One example of a security boundary is a firewall implemented based on an ACL configured by the entity.

Migrating certain applications from being executed in a local computing facility to a cloud computing facility can be difficult due to data security concerns. For example, execution of an application of a user can consume confidential data from a data source in a local computing facility. As used herein, consuming data generally refers to processing data from a data source to generate result data according to logics in an application or a component thereof. For instance, the application can be a model developer configured to generate a behavior model based on confidential data (e.g., financial transactions) via machine learning. As such, even when the model developer can be migrated to the cloud computing facility, execution of the model developer at the cloud computing facility may be inoperable because the confidential data may not be allowed to be migrated to the cloud. Even when the confidential data is migrated to the cloud, the confidential data is typically obfuscated (e.g., via anonymizing) to such degrees that the model developer may not adequately "learn" from the obfuscated data to generate a satisfactory behavioral model.

Several embodiments of the disclosed technology can address certain aspects of the foregoing difficulties by implementing distributed execution of an application in a computing framework based on types of data consumed by individual components of the application. In one example, an application can be divided into multiple components based on respective types of data the individual components consume. As such, a component that consumes confidential data from a local computing facility can be separated from another that consumes data available at a cloud computing facility or does not consume any data at all. For instance, in the model developer example above, the model developer may be divided into a user interface component that receives and processes user input to the model developer and a data trainer that is configured to generate a behavioral model based on raw confidential data. In other examples, an application can be divided into multiple components at least some of which consume data from data sources at multiple local computing facilities.

Based on the types of data that the individual components consume, the computing framework can be configured to execute components of an application at corresponding locations from which the components consume data. For example, a component that consumes data from a data source at a local computing facility can be deployed in the local computing facility inside the security boundary. Another component that consumes data from a data source at a cloud computing facility can be deployed in the cloud computing facility. During operation, the various components of the application can exchange data that complies with various data control policies of the local computing facility such that the application can be executed in the cloud while allowing the local computing facility to maintain control over the confidential data stored in the local computing facility, as described in more detail below with reference to FIGS. 1-7.

FIG. 1 is a schematic diagram of a computing framework 100 implementing distributed application execution for cloud computing in accordance with embodiments of the present technology. As shown in FIG. 1, the computing framework 100 can include a local computing facility 102 interconnected to a cloud computing facility 110 via a computer network 108. The computer network 108 can include the Internet, a wide area network, a virtual private network, or other suitable types of computer network. Even though only one local computing facility 102 is shown in FIG. 1, in other embodiments, the computing framework 100 can include multiple local computing facilities 102 can be interconnected to a single cloud computing facility 110, as described below with reference to FIG. 4.

As shown in FIG. 1, the local computing facility 102 can be an on-premise network that includes a local area network 107 interconnecting one or more endpoints such as servers 104, client devices 103, and a data store 106 containing confidential data 111 to an entity exercising control over the local computing facility 102. The local area network 107 can include multiple routers, switches, firewalls, or other suitable network devices (not shown) interconnecting the servers 104, the client device 103, and the data store 106 via wired or wireless communications media. The servers 104 can be individually configured to execute suitable instructions to provide functionality for the client devices 103. For example, the servers 104 can be configured to provide a file management system, an electronic mail exchange, or other suitable computing services. As discussed in more detail below with reference to FIGS. 3A-3C, the servers 104 can also be configured to implement a control layer 170 (shown in FIG. 3B) that is configured to facilitate distributed execution of applications in the computing framework 100.

The client devices 103 can each include a computing device that facilitates corresponding users 101 to access the servers 104 and various cloud services provided by the cloud computing facility 110 via the computer network 108. In the illustrated example, the client devices 103 individually include a desktop computer. In other examples, the client devices 103 can also include laptop computers, tablet computers, smartphones, or other suitable computing devices. Even though two users 101 and corresponding client devices 103 are shown in FIG. 1 for illustration purposes, in other embodiments, the cloud computing facility 110 can facilitate any suitable numbers of users 101.

The data store 106 can include a data storage facility with suitable hardware and/or software components configured to facilitate storage, retrieval, maintenance, and other management operations of the confidential data 111. For instance, the data store 106 can include a database server executing suitable instructions to provide a database application configured to enter and retrieve information from a database according to a database language, such as Structured Query Language (SQL). One example database application is Access provided by Microsoft Corporation of Redmond, Wash.

The confidential data 111 can be any data that the entity (not shown) exercising control over the local computing facility 102 is not willing or even legally allowed to share. For example, the entity can be a bank, and the confidential data 111 can include personal identifiable information of customer, financial transaction records of consumers, records of interactions with customers, and/or other suitable types of information. The bank may not be willing or legally allowed to share such confidential information 111 with any third-party entities, such as a cloud service provider (not shown) of the cloud computing facility 110. As described in more detail below with reference to FIGS. 3A-3C, an application 147 (shown in FIG. 3B) executed in the cloud computing facility 110 can still consume the confidential data 111 in the local computing facility 102 via distributed application execution even though the cloud computing facility 110 has no direct access to the confidential data 111.

As shown in FIG. 1, the local computing facility 102 includes an on-premise gateway 105 configured to interface with the cloud computing facility 110 via the computer network 108. In certain embodiments, the on-premise gateway 105 can be configured to implement a suitable secure communications protocol and provide a security boundary 109 between the local computing facility 102 and the cloud computing facility 110. In one example, the on-premise gateway 105 can include a router configured to implement IPsec protocol to provide data confidentiality, data integrity, and data authentication between the on-premise gateway 105 and one or more instances of a cloud gateway 114 via the computer network 108. In other examples, the on-premise gateway 105 can also include a switch, a server, or other suitable components configured to implement additional and/or different secure communications protocols in order to provide the security boundary 109.

Also shown in FIG. 1, the cloud computing facility 110 can include one or more hosts 116, a platform controller 118, a network storage 112, and first and second instances 114a and 114b of a cloud gateway 114 operatively coupled by a cloud network 117. In certain embodiments, the hosts 116 can individually include a physical server or a computing blade having several physical servers individually having one or more non-volatile data storage device, computer memories, network interface cards, and/or other suitable computing components. In other embodiments, the hosts 116 can also include one or more physical servers with multiple processor cores, or other suitable types of computing devices. Though not shown in FIG. 1, the hosts 116 can be organized into racks, availability zones, groups, sets, computing clusters, or other suitable divisions. Even though two hosts 116 are shown in FIG. 1 for illustration purposes, in other embodiments, the cloud computing facility 110 can include any suitable numbers of hosts 116 and/or other suitable types of components. The individual hosts 116 can be configured to host one or more virtual machines 144 (shown in FIG. 2) or other suitable software components, as described in more detail with reference to FIG. 2.

The platform controller 118 can include a fabric controller, a datacenter controller, application delivery controller, or other suitable types of controller configured to monitor status and manage operations of the hosts 116 in the cloud computing facility 110. For example, the platform controller 118 can monitor whether a host 116 or components thereof has failed. In response to detecting a failure of the host 116 or components thereof, the platform controller 118 can attempt to remedy the detected failure by, for instance, migrating virtual machines hosted on the failed host 116 to other hosts 116, restarting the failed host 116, replacing hardware components of the failed host 116, and/or perform other suitable operations. Though the platform controller 118 are shown as separate physical servers in FIG. 1, in other embodiments, the platform controller 118 can also include computing services provided by one or more of the hosts 116 in the cloud computing facility 110.

The cloud gateway 114 can be configured to interface with the on-premise gateway 105 via one or more network connections, such as a virtual private network (VPN) connection via the computer network 108. The cloud gateway 114 can implement various communications/security protocols used for securing and encrypting transmitted data between the on-premise gateway 105 at the local computing facility 102 and a virtual network 146 (shown in FIG. 2) at the cloud computing facility 110. As shown in FIG. 1, the cloud gateway 114 include first and second instances 114a and 114b each having a corresponding network address (e.g., an IP address) suitable for routing network traffic from the on-premise gateway 105 to the first or second instance 114a or 114b via the computer network 108. In other embodiments, the cloud gateway 114 can include three, four, or any suitable number of instances (not shown).

As shown in FIG. 1, the on-premise gateway 105 can be connected to either the first or second instance 114a and 114b of the cloud gateway 114 via the computer network 108 to transmit/receive network traffic from the virtual network 146 at the cloud computing facility 110. For example, both client devices 103 can transmit/receive data to corresponding virtual machines 144 at the cloud computing system 100. Upon receiving such data, the on-premise gateway 105 can apply corresponding security processing (e.g., encapsulation, encryption, etc.) to the data before sending the secured data as packets (not shown) to the cloud computing facility 110 via the computer network 108. Upon receiving the packets, a load balancer (not shown) can inspect the packets for one or more of a source address, a destination address, and a protocol value used for the packets. Using such parameters and/or other suitable parameters of the packets, the load balancer can identify the received packets as belonging to one or more outer flows and forward the packets of certain outer flows to a suitable corresponding destination, for instance, the first instance 114a or the second instance 114b.

The network storage 112 can include one or more network storage facilities with suitable hardware and/or software components configured to facilitate storage, retrieval, maintenance, and other management operations of data accessible to the hosts 116 in the cloud computing facility. For example, as shown in FIG. 1, the network storage 112 can include an executable file or "image" of an application 147. In accordance with embodiments of the disclosed technology, the application 147 can include multiple components (identified individually as first and second components 147a and 147b, respectively) and a corresponding metadata file 149 based on types of data consumed by each of the components 147a and 147b. For example, the application 147 may be configured to generate a gift suggestion to a first user 101' based on purchasing or browsing history data of a second user 101" using the client device 103 and/or servers 104 in the local computing facility 102.

When designing the application 147, a developer (not shown) can partition the application 147 into a first component 147a interconnected to a second component 147b via data exchange. The first component 147a can be configured to receive input data from as well as providing output data to the first user 101'. The second component 147b can be configured to compile the confidential data 111 having information of the purchasing or browsing history of the second user 101" at the local computing facility 102 and produce one or more gift suggestions based on frequencies of purchasing, browsing, or other suitable criteria. As such, the first component 147a can be configured to consume data from a first data source, i.e., input data from the first user 101' while the second component 147b can be configured to consume data from a second data source, i.e., data of the purchasing or browsing history of the second user 101" from the confidential data 111 at the local computing facility 102.

Upon identifying the types of data to be consumed by the first and second components 147a and 147b of the application 147, the developer can further determine locations or data sources of such data for consumption by the components 147a and 147b. In the illustrated example, the developer can determine that a first data source, e.g., input from the first user 101', can be located at the cloud computing facility 100 while the second data source can be located on the local computing facility 102, e.g., the data store 106. Upon identifying the locations of the first and second data sources, the developer can generate the metadata file 149 for execution of the application 147. In one example, the metadata file 149 can identify, for each of the components 147a and 147b, a location of execution, data consumed as input, and data provided as output. Thus, in the illustrated example, the metadata file 149 can include data that identifies that request data is to be transmitted from the first component 147a to the second component 147b while suggestion data is to be transmitted from the second component 147b to the first component 147a. In other examples, the metadata file 149 can also indicate a network location at which the various components 147a and 147b may be retrieved as well as other execution characteristics, such as suitable runtime environment parameters. Based on the metadata file 149, the computing framework 100 can be configured to deploy various components 147a and 147b of the application 147 at the designated locations when the application 147 is launched, as described in more detail below with reference to FIGS. 3A-3C.

Figure 2:
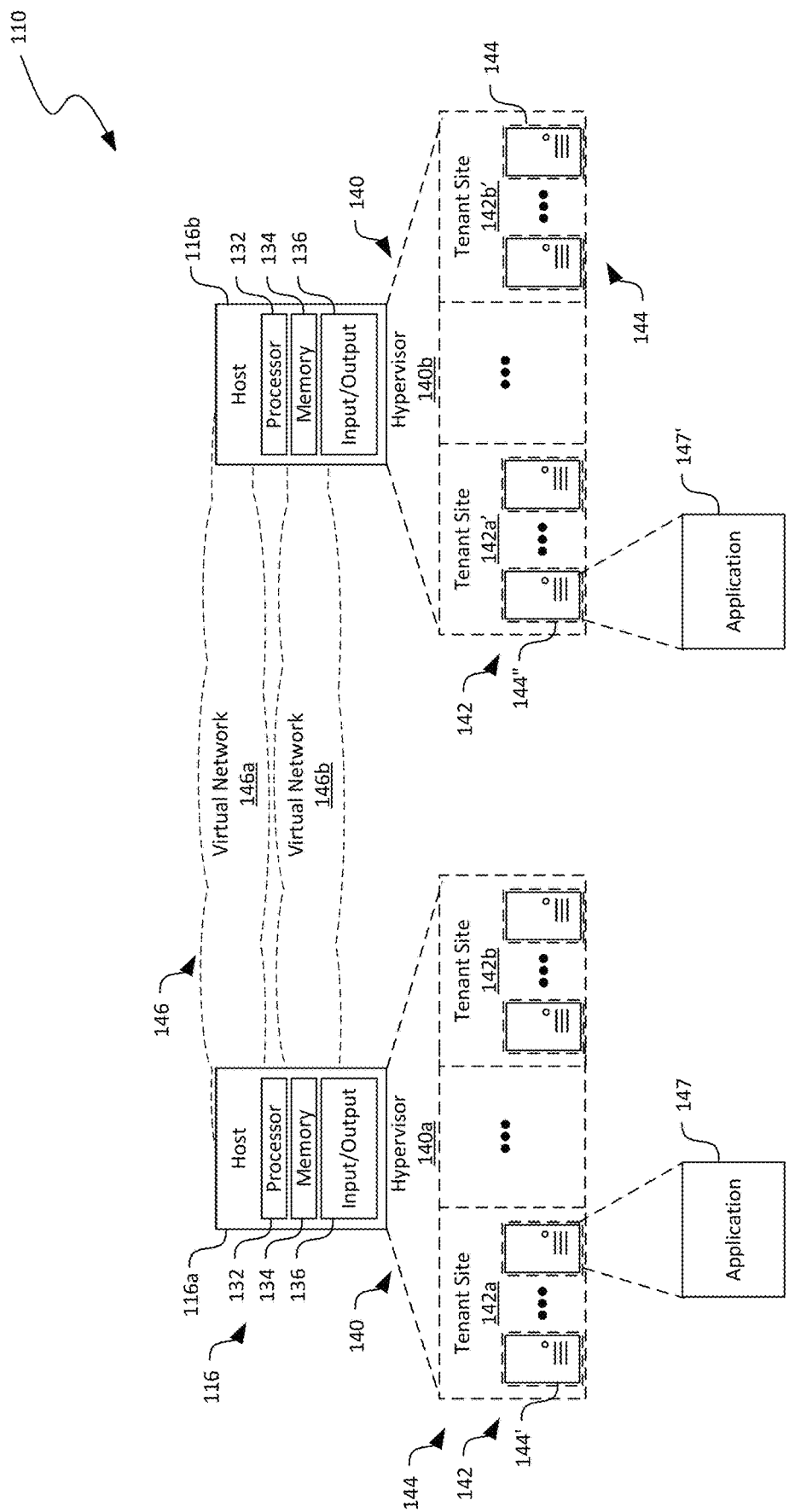
FIG. 2 is a schematic diagram illustrating certain hardware/software components of the computing framework of FIG. 1 in accordance with embodiments of the disclosed technology.

FIG. 2 is a schematic diagram illustrating certain hardware/software components of the cloud computing facility 110 in the computing framework 100 of FIG. 1 in accordance with embodiments of the disclosed technology. In FIG. 2, only certain components of the cloud computing facility 110 of FIG. 1 are shown for clarity. In other examples, the cloud computing facility 110 can include additional and/or different components as shown in FIG. 2.

As shown in FIG. 2, the first host 116a and the second host 116b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed herein). The input/output component 136 can include a network interface card or other suitable types of input/output devices configured to accept input from and provide output to an operator and/or an automated software controller (not shown).

The memory 134 of the first and second hosts 116a and 106b can include instructions executable by the corresponding processors 132 to cause the individual hosts 116 to provide a hypervisor 140 (identified individually as first and second hypervisors 140a and 140b) and other suitable virtual components such as virtual network interface card, virtual switches, etc. (not shown). The hypervisors 140 can individually be configured to initiate, monitor, terminate, and/or otherwise locally manage one or more virtual machines 144 organized into tenant sites 142. For example, as shown in FIG. 2, the first host 116a can provide a first hypervisor 140a that manages first and second tenant sites 142a and 142b, respectively, for the same or different tenants or users 101 (FIG. 1). The second host 116b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a tenant. For example, the first host 116a and the second host 116b can both host the tenant site 142a and 142a' for a first user 101a. The first host 116a and the second host 116b can both host the tenant site 142b and 142b' for a second user 101b (FIG. 1). The cloud computing facility 110 can also include one or more virtual networks 146 that interconnect the tenant sites 142a and 142b across multiple hosts 116. For example, a first virtual network 146a interconnects the first tenant sites 142a and 142a' at the first host 116a and the second host 116b. A second virtual network 146b interconnects the second tenant sites 142b and 142b' at the first host 116a and the second host 116b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another even though the virtual machines 144 are located on different hosts 116. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a virtual network 146. Thus, different virtual networks 146 can use one or more virtual network addresses that are the same. Example virtual network addresses can include IP addresses, MAC addresses, and/or other suitable addresses.

During operation, each virtual machine 144 can be executing a corresponding operating system, middleware, and/or applications. For example, as shown in FIG. 2, the virtual machine 144 of the first host 116a can be configured to execute suitable instructions of an application 147 while the virtual machine 144 of the second host 116b can be configured to execute suitable instructions of another application 147'. In other examples, a container (e.g., a Docker) hosted on the individual hosts 116 can also be configured to provide the instance of the applications 147 and 147' or components thereof. In further examples, the various virtual machines 144 in the cloud computing facility 110 can be configured to execute a first component 147a of an application 147 while in communication with and receive data from a second component 147b of the same application 147 via the computer network 108 (FIG. 1). As such, the first component 147a can consume the confidential data 111 at the local computing facility 102 even though the first component 147a has no direct access to the confidential data 111, as described in more detail below with reference to FIGS. 3A-3C.

Figure 3A:
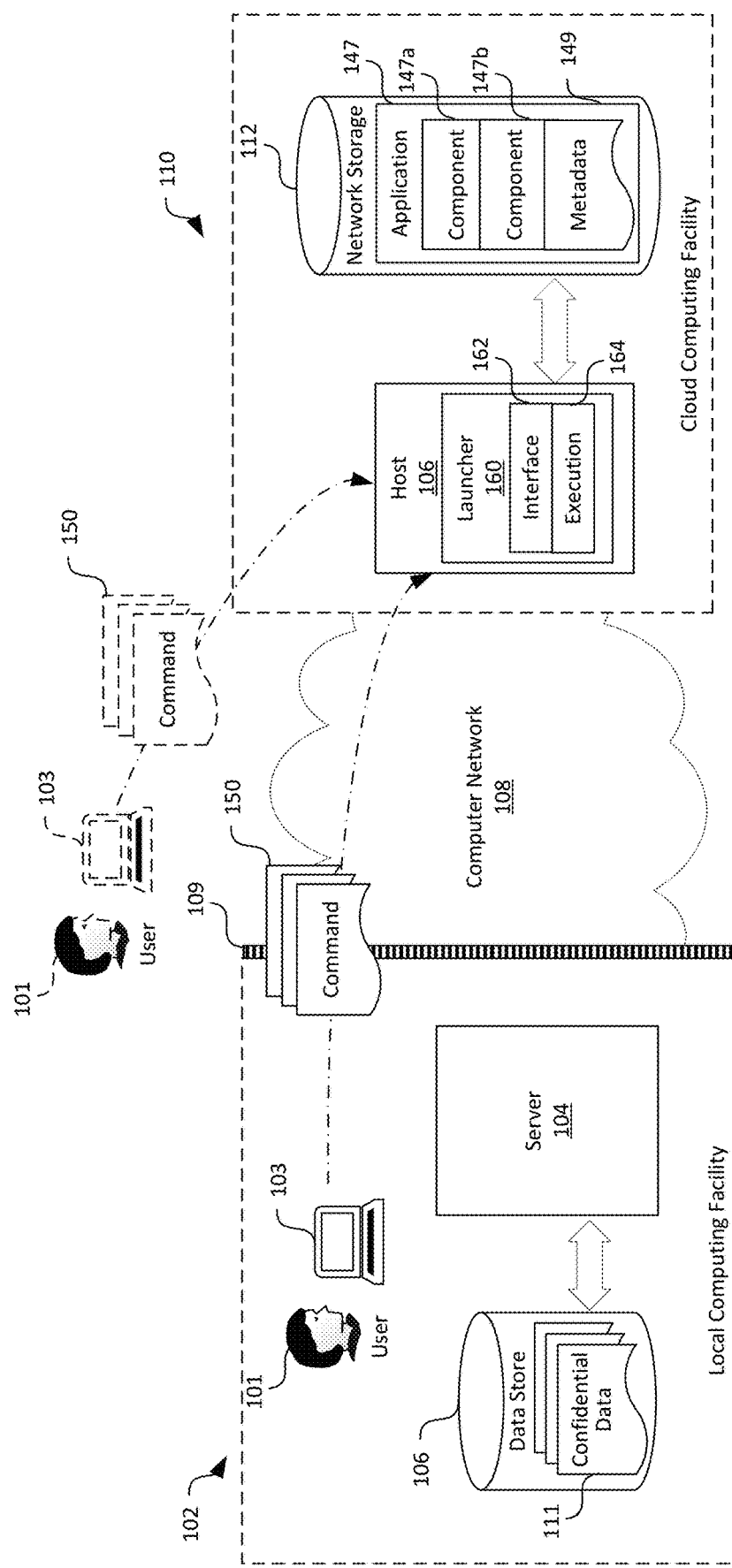
FIGS. 3A-3C are schematic block diagrams illustrating certain stages of distributed application execution for cloud computing in accordance with embodiments of the present technology.
Figure 3B:
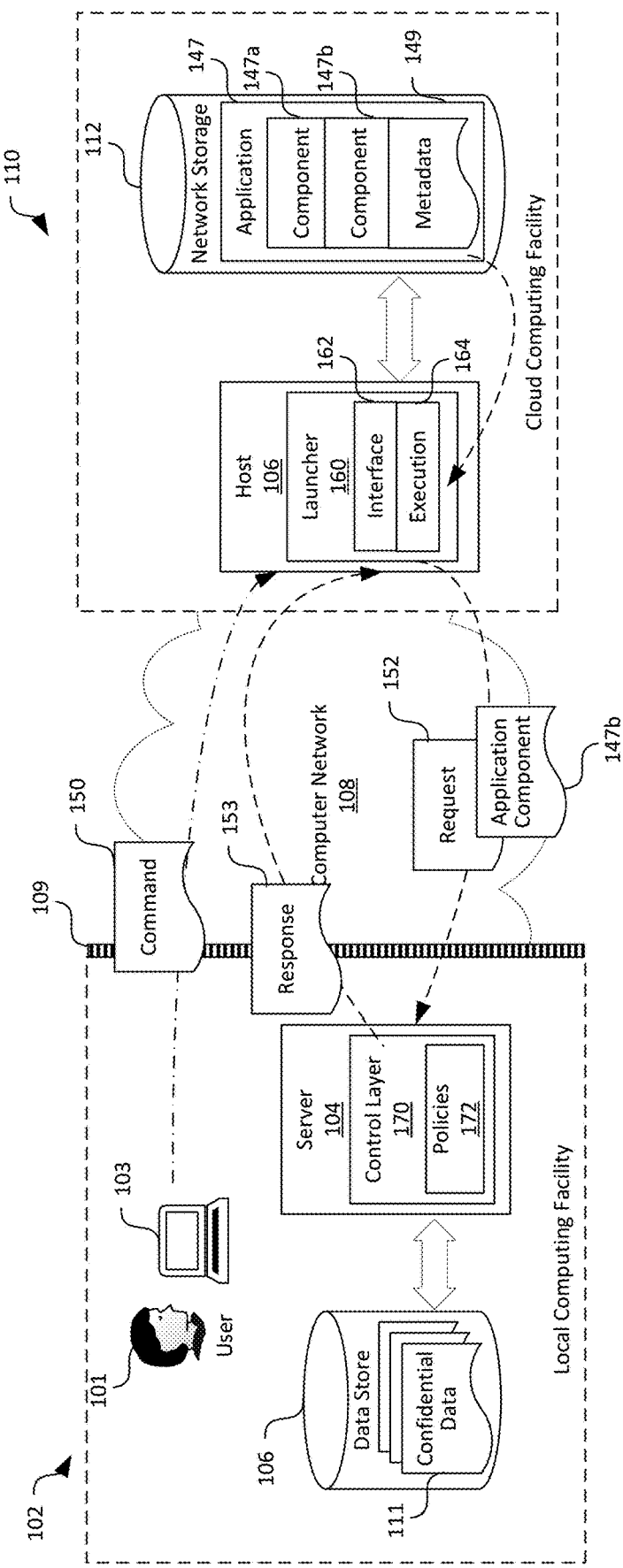
Figure 3C:
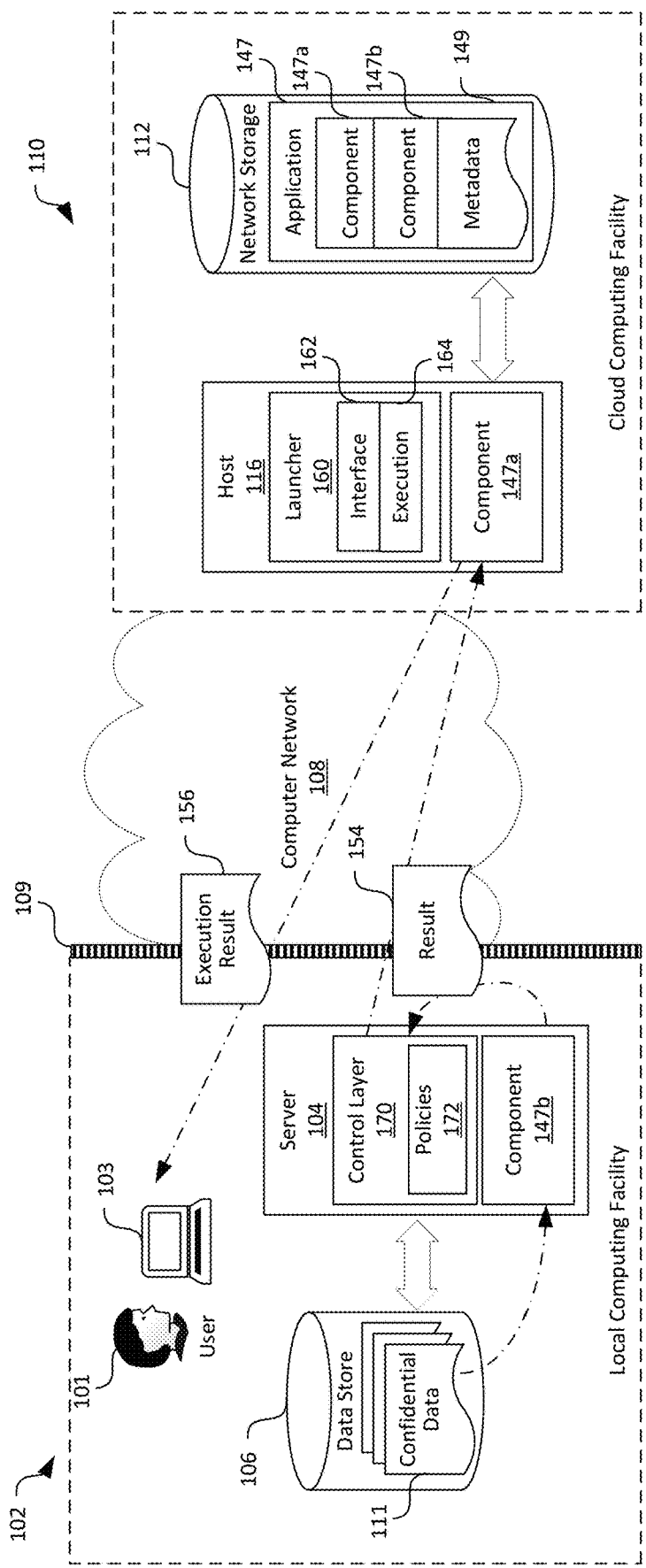

FIGS. 3A-3C are schematic block diagrams illustrating certain stages of distributed application execution for cloud computing in accordance with embodiments of the present technology. In FIGS. 3A-3C, certain elements of the computing framework 100 have been omitted for clarity. For instance, only one server 104 and one host 105 are shown in FIGS. 3A-3C for executing a component 147a or 147b of an application 147. In other examples, the computing framework 100 can be configured to execute multiple components (not shown) using multiple servers 104 or hosts 116 in the local computing facility 102 or the cloud computing facility 110.

As shown in FIG. 3A, the host 116 at the cloud computing facility 110 can be configured to execute suitable instructions to provide a launcher 160 launching an application 147. In the illustrated embodiment, the launcher 160 can include an interface module 162 and an execution module 164 operative coupled to each other. In other embodiments, the launcher 160 can also include a network, database, input/output or other suitable types of modules.

The interface module 162 can be configured to receive a command from a user 101 for launching the application 147. In the illustrated example, the user 101 transmits the command 150 from a client device 103 in the local computing facility 102 to the interface module 162 via the computer network 108. In other examples, the user 101 (shown in phantom lines for clarity) can be located outside of the local computing facility 102 and submits the command 150 via other suitable channels in the computer network 108. Upon receiving the command 150, the interface module 162 can be configured to authenticate the command 150, for example, based on suitable credentials submitted by the user 101. The interface module 162 can then forward the command 150 to the execution module 164 for further processing upon authenticating the command 150.

As shown in FIG. 3B, the execution module 164 can be configured to retrieve the metadata file 149 of the application 147 upon receiving the command 150, and determine execution locations of the various components 147a and 147b of the application 147 based on the retrieved metadata file 149. For example, the execution module 164 can determine that the first component 147a is to be executed in the host 116 (or another host 116) at the cloud computing facility 110 while the second component 147b is to be executed on the server 104 (or another server 104) at the local computing facility 102. In response, the execution module 164 can be configured to transmit a request 152 to the local computing facility 102 for executing the second component 147b of the application 147. In the illustrated example, the request 152 includes a copy of the second component 147b. In other examples, the request 152 can also include identifications of types of data transmitted to and types of data received from the local computing facility 102. In further examples, the request 152 can also include a syntax of data transfers between the cloud and local computing facilities 110 and 102. For instance, the request 152 can identify that a first type of data is followed by a second type of data that is transmitted to/received from the local computing facility 102.

As shown in FIG. 3B, the local computing facility can be configured to deploy a control layer 170 between the first and second components 147a and 147b executed at the cloud and local computing facilities 110 and 102, respectively. The control layer 170 is configured to authorize, direct, monitor, and trace all communications between the various components 147a and 147b of the application 147 deployed at both the cloud and local computing facilities 110 and 102. During deployment, upon receiving the request 152 from the execution module 164 at the cloud computing facility 110, the control layer 170 can be configured to analyze the types of data received from and transmitted to the cloud computing facility 110 and determine whether communication of the types of data are allowed based on policies 172, In certain implementations, an administrator (not shown) of the local computing facility 102 can configure the policies 172 at the local computing facility 102. For instance, the administrator can configure the policies 172 to forbid transmission of any personal identifiable information being transmitted to the cloud computing facility 110. The administrator can also be configured the policies 172 to limit or forbid transmission of any financial transaction, personal purchasing or browsing history of users 101, or other types of data. In further examples, the administrator can configure the policies 172 to limit or forbid transmission of data based on privacy, security, legal compliance, or other suitable criteria.

In one embodiment, the control layer 170 can reject the request 152 and prevent execution of the second component 147b in the local computing facility 102 when the types of data received from and transmitted to the cloud computing facility 110 by the second component 147b violates any of the policies 172. In other embodiments, the control layer 170 can also be configured to record receipt, analysis, and rejection of the request 152. In further embodiments, the control layer 170 can further be configured to raise an alarm, reject any further requests (not shown) from the execution module 164, or perform other suitable operations.

The control layer 170 can authorize execution of the second component 147b in the local computing facility 102 when the types of data received from and transmitted to the cloud computing facility 110 by the second component 147b does not violate any of the policies 172. The control layer 170 can then transmit a response 153 to the execution module 164 to indicate that the second component 147b is authorized to be executed in the local computing facility 102. The control layer 170 can also be configured to trigger or otherwise facilitate launching of the second component 147b in the local computing facility 102 by, for instance, downloading an image of the second component 147b, allocating execution of the second component 147b to one of the servers 104, and issuing a command to the allocated server 104 to execute the second component 147b.

Upon receiving the response 153 from the control layer 170, the execution module 164 can be configured to cause the first component 147a to be instantiated and executed in the cloud computing facility 110 and requests data from the second component 147b to be executed in the local computing facility 102. As shown in FIG. 3C, in the illustrated example, the first component 147a is executed on the host 116 also hosting the launcher 160, and the second component 147b is executed in the server 104 also hosting the control layer 17. In other examples, at least one of the first or second component 147a or 147b can be executed on other hosts 116 or servers 104 not hosting the launcher 160 or the control layer 170.

During operation, the first component 147a can be executed in the cloud computing facility and request application data from the second component 147b executed in the local computing facility 102. The control layer 170 can be configured to receive, inspect, record, and route all communication between the first and second components 147a and 147b executed at the cloud and local computing facilities 110 and 102, respectively. As such, the first component 147a of the application 147 executing in the cloud computing facility 110 does not have a direct link to the second component 147b of the application 147 executing in the local computing facility 102. Instead, communications between the first and second components 147a and 147b pass through the control layer 170. For example, the control layer 170 can be configured to receive data from the first component 147a, determine whether such data is in accordance with the metadata file 149 and/or the policies 172. Upon determine that the received data is in accordance with the metadata file 149 and/or the policies 172, the control layer 170 can be configured to forward the received data to the second component 147b.

Similarly, the control layer 170 can be configured to received data from the second component 147b designated to the first component 147a and inspect the received data to determine whether the data complies with the metadata file 149 and/or the policies 172. The data can include a result 154 of executing the second component 147b by consuming the confidential data 111 from the data store 106 in the local computing facility 102. For example, the second component 147b can include a model developer that is configured to develop a behavioral model of the user 101 using machine learning based on purchasing or browsing history of the user 101 stored as the confidential data 111 in the data store 106. By consuming such confidential data 111, the second component 147b can generate, for instance, data indicating a most wanted item by the user 101 based on the purchasing or browsing history of the user 101.

Upon determining that the data complies with the metadata file 149 and/or the policies 172, the control layer 170 can be configured to forward the data to the first component 147a via the computer network 108. Otherwise, the control layer 170 can block the data from being transmitted to the first component 147a, raise an alarm, or perform other suitable actions. The control layer 170 can also record all events of such communications for archiving, auditing, or other suitable uses. As shown in FIG. 3C, upon receiving the application data (shown in FIG. 3C as Result 154), the first component 147a can use the received result 154 to generate an overall execution result 156 and transmit the execution result 156 to the user 101.

Several embodiments of the disclosed technology can thus allow consumption of the confidential data 111 in the local computing facility 102 while allowing an entity exercising control over the local computing facility 102 to maintain strict control over such confidential data 111. By partitioning the application 147 into the first and second components 147a and 147b based on the types of data the first and second components 147a and 147b consume, a developer can designate suitable execution locations at which data is consumed locally. By executing the second component 147b that consumes the confidential data 111 at the local computing facility 102, sharing of such confidential data 111 with a cloud service provider can be avoided. Instead, the local computing facility 102 only transmits non-confidential data, such as the result 154 to the cloud computing facility 110. As such, obfuscation of the confidential data 111 for sharing with the cloud service provider as well as maintaining the obfuscated confidential data 111 by the cloud service provider can be avoided.

Though only the first and second components 147a and 147b are shown in FIGS. 1-3C for illustration purposes, in other embodiments, the application 147 can include three, four, five, or any other suitable number of components. In one example, the additional components can be executed on multiple hosts 116 or server 104 in the cloud and local computing facilities 110 and 102, respectively.

Figure 4:
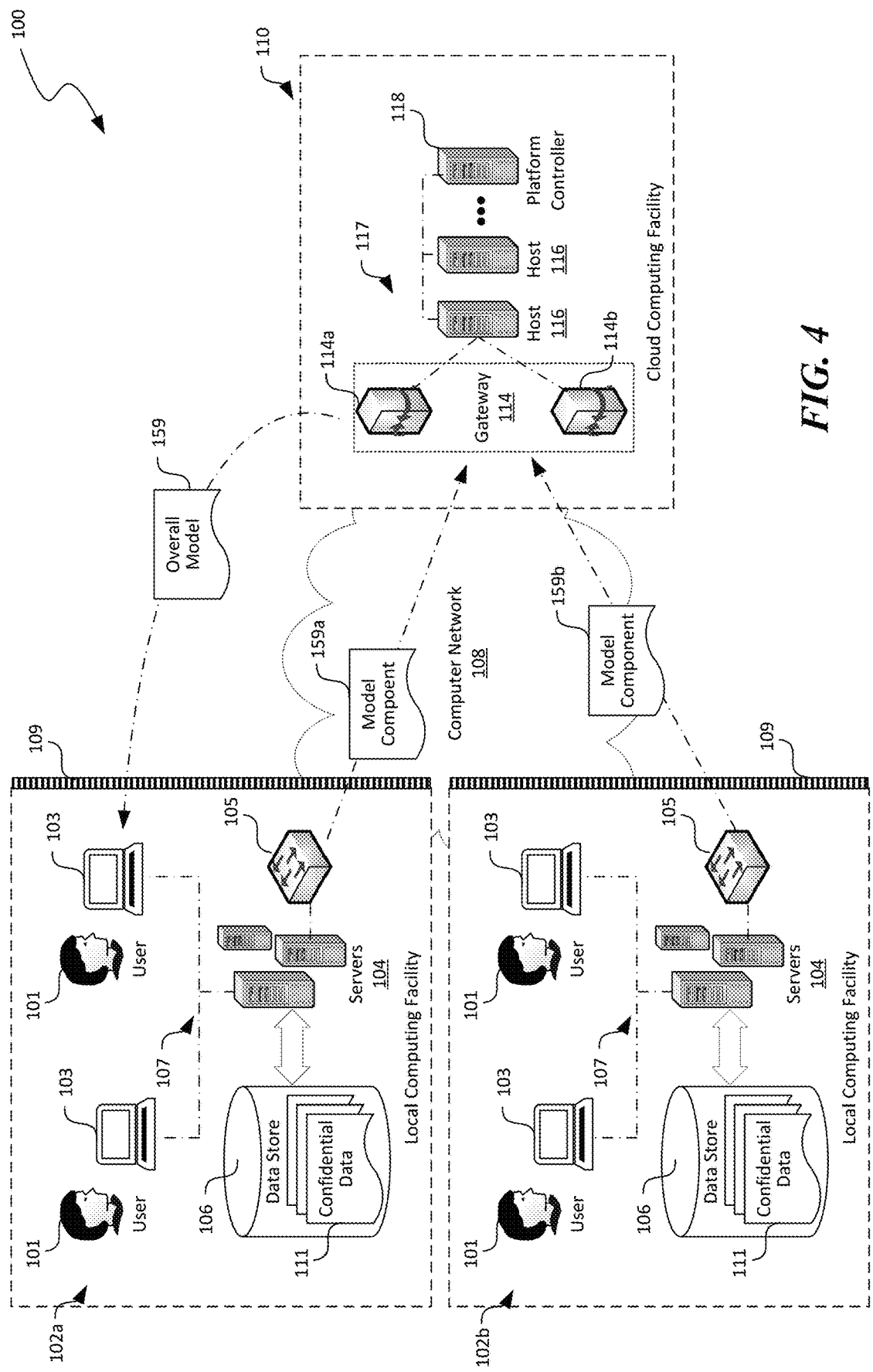
FIG. 4 is a schematic block diagram illustrating federated processing with multiple local computing facilities in accordance with embodiments of the present technology.

In other examples, one or more of the additional components can be executed on additional local computing facilities (not shown). For instance, as shown in FIG. 4, the computing framework 100 can include a first local computing facility 102a and a second local computing facility 102b operatively coupled to the cloud computing facility 110 via the computer network 108. Each of the first or second local computing facility 102a and 102b can include own confidential data 111 and be configured to execute one or more components of the application 147 (FIG. 3A) in the distributed manner as described above with reference to FIGS. 3A-3C. In further examples, the computing framework can also include one or more additional cloud computing facilities (not shown) that are configured to execute suitable components of the application 147.

Several embodiments of the disclosed technology can thus allow federated data analysis of the confidential data 111 from multiple local computing facilities 102. For example, the application 147 can include a model developer is configured to develop a financial transaction model of multiple banks by partitioning the model developer into components (not shown) executed in the cloud computing facility 110 and multiple local computing facilities 102a and 102b. Each local computing facility 102a or 102b can be configured to analyze respective confidential data 111 to produce a model component 159a or 159b that does not include any confidential data 111. Instead, the model components 159a and 159b can each include a pattern observed based on the confidential data 111. The model developer at the cloud computing facility 110 can then combine the various model components 159a and 159b to general an overall model 159 without having access to the confidential data 111 in the various local computing facilities 102a and 102b.

Figure 5:
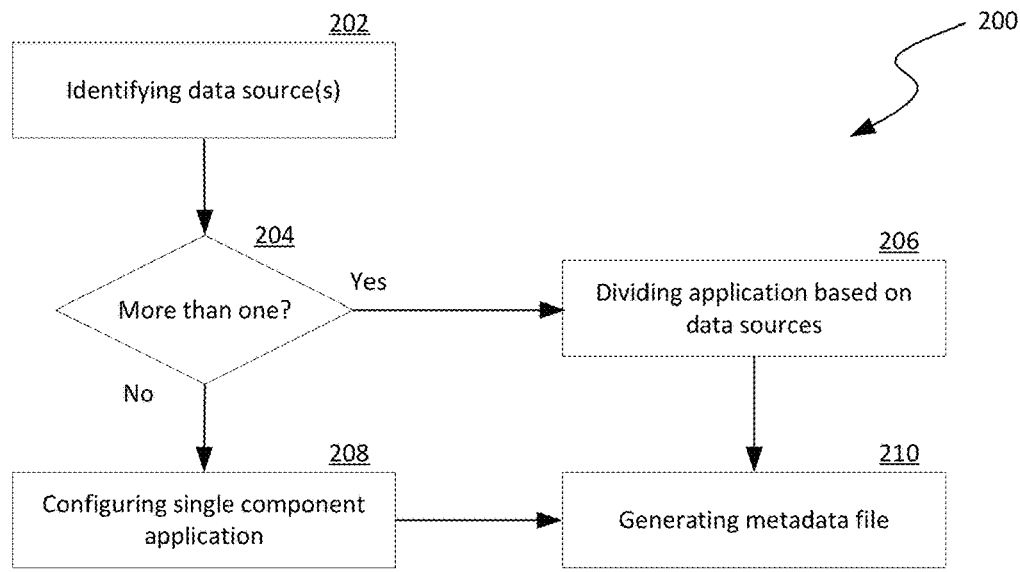
FIGS. 5-6C are flow diagrams illustrating aspects of processes for distributed application execution for cloud computing in accordance with embodiments of the present technology.
Figure 6A:
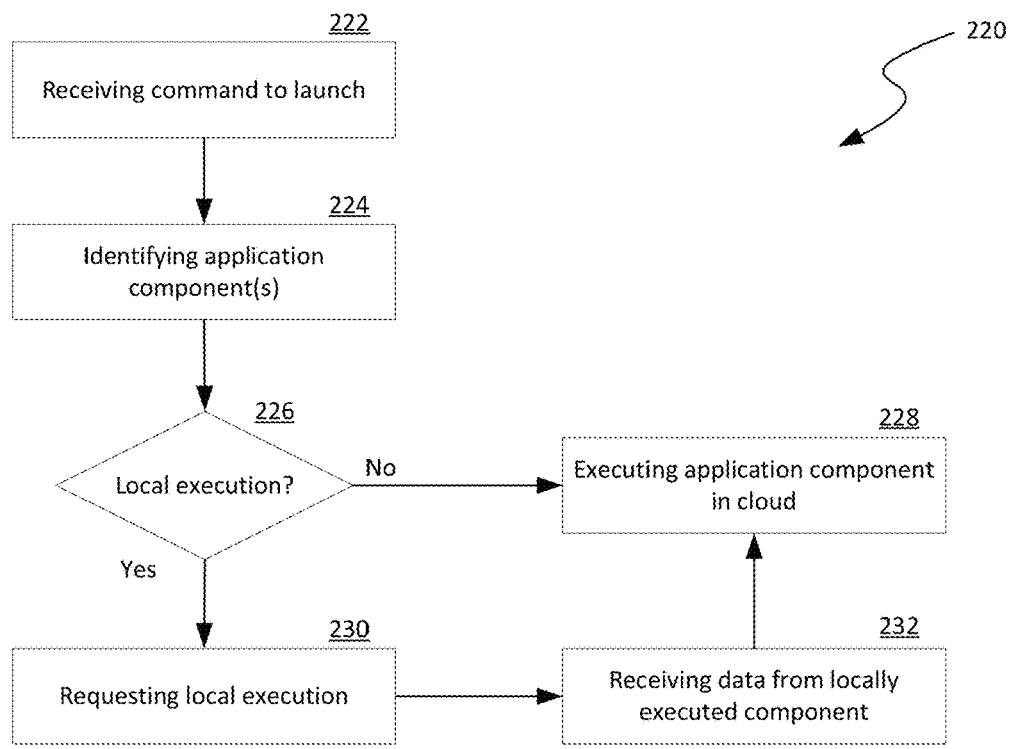
Figure 6B:
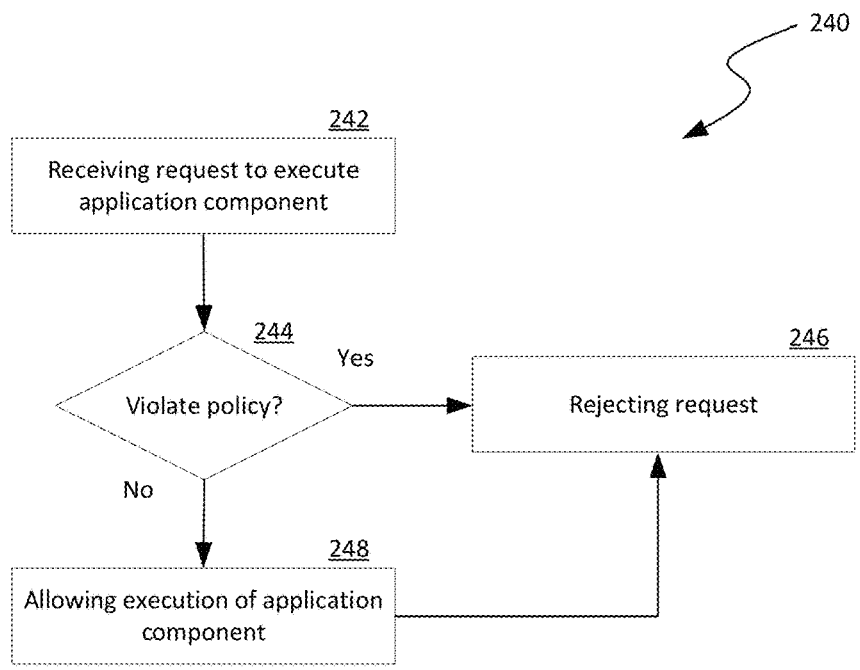
Figure 6C:
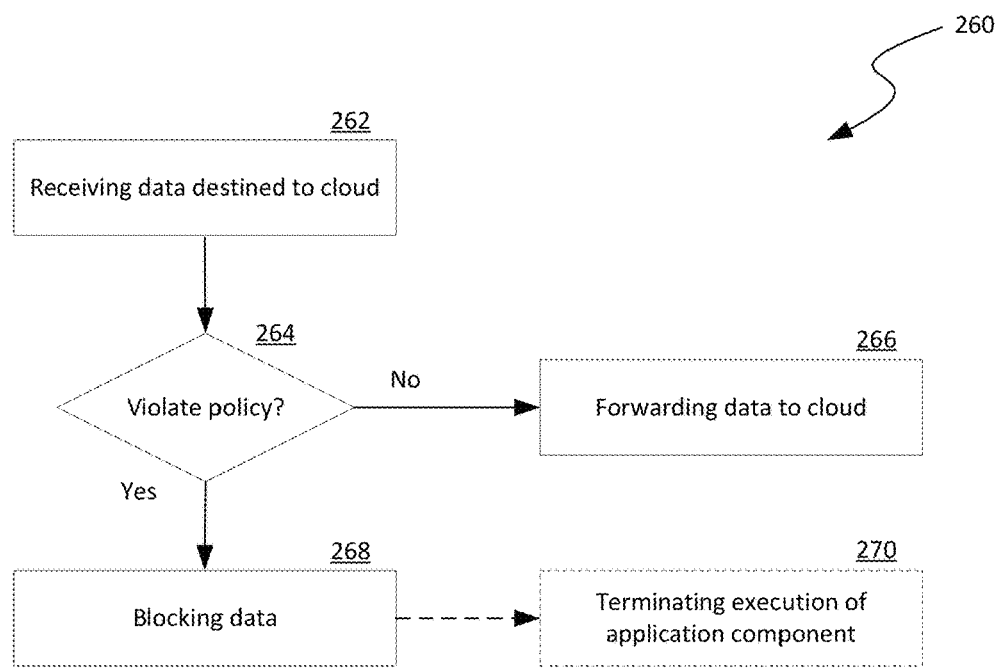

FIGS. 5-6C are flow diagrams illustrating aspects of processes for distributed application execution for cloud computing in accordance with embodiments of the present technology. Though various aspects of the processes are described below in the context of the computing framework 100 of FIGS. 1-4, in other embodiments, the processes can also be implemented in computing frameworks with additional and/or different devices and/or components.

As shown in FIG. 5, a process 200 can include identifying one or more data sources consumed by an application at stage 202. The data sources can be at a local computing facility or at a cloud computing facility. The process 200 can then include a decision stage 204 to determine whether multiple data sources are present. In response to determining that only one data source is present, the process 200 proceeds to configuring a single component application at stage 208. The single component application is designated to be executed in a single location. In response to determining that multiple data sources are present, the process 200 proceeds to dividing the application into components individually corresponding to one of the data sources at stage 206. The individual components are interconnected to one another via data exchange. The process 200 can then proceed to generating a metadata file that describes various execution locations and optionally other execution parameters of the application, as described above with reference to FIGS. 1-4.

As shown in FIG. 6A, a process 220 of launching an application in a cloud computing facility can include receiving a command to launch at stage 222. The process 220 can then include identifying various components of the application at stage 224. Such identification can be based on a metadata file or via other suitable techniques. The process 220 can then include a decision stage 226 to determine, for each of the components, whether the component is to be executed in a local computing facility or in the cloud computing facility. In response to determining that a component is to be executed not in a local computing facility, the process 220 proceeds to executing the component in the cloud at stage 228. Otherwise, the process 220 proceeds to requesting local execution at stage 230. The process 220 can then proceed to receiving data from the locally executed component and providing the received data to the executed component in the cloud at stage 232. Example operations of requesting local execution and receiving data from the locally executed component are described above with reference to FIGS. 3A-3C.

As shown in FIG. 6B, a process 240 of authorizing execution of a component of an application in a local computing facility can include receiving a request to execute a component of an application at stage 242. The process 240 can then include a decision stage to determine whether any data received or transmitted by the component violates any policies in the local computing facility. Example operations of receiving and analyzing request for execution of an application component are described above with reference to FIGS. 3A-3C. In response to determining that the data received or transmitted by the component violates at least one of the policies in the local computing facility, the process 240 proceeds to rejecting the request and preventing execution of the component at stage 246. Otherwise, the process 240 proceeds to allowing execution of the component at stage 248.

As shown in FIG. 6C, a process 260 of inspecting data transmission between components executed on a local computing facility and a cloud computing facility can include receiving data destined to the cloud computing facility at stage 262. The process 260 can then include a decision stage 264 to determine whether the data violates any policies of the local computing facility. Example operations of inspecting the data destined to the cloud are described above with reference to FIGS. 3A-3C. In response to determining that the data violates at least one of the policies of the local computing facility, the process 260 proceeds to blocking the data from being transmitted to the cloud at stage 268 and optionally terminating execution of the component at the local computing facility at stage 270. Otherwise, the process 260 can include forwarding the data to the cloud at stage 266.

FIG. 7 is a computing device 300 suitable for certain components of the computing framework 100 in FIG. 1. For example, the computing device 300 can be suitable for the client devices 102, hosts 116, or the cloud gateway 114 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term computer readable storage media or computer readable storage device excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term computer readable storage medium excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for federated data analysis in a computing framework having a first local computing facility of a first tenant and a second local computing facility of a second tenant interconnected to a public computing facility via a computer network, comprising:
   receiving a command to execute an application at the public computing facility, the application including multiple components interconnected to one another via data;
   in response to receiving the command, determining, for the individual components, an execution location based on data consumed by the individual components during execution; and
   in response to determining that one of the components is to be executed in the first local computing facility and that another one of the components is to be executed in the second local computing facility,
      transmitting, from the public computing facility to each of the first and second local computing facilities, a request to execute the one and the another one of the components in the first and second local computing facilities, respectively;
      receiving first data from the one of the components executed at the first local computing facility and second data from the another one of the components executed at the second local computing facility without having direct access from the public computing facility to data consumed by the one of the components executed at the first computing facility or to data consumed by the another one of the components executed at the second computing facility; and
      combining the received first and second data to generate an execution result of the application.

2. The method of claim 1, further comprising:
   in response to determining that a further one of the components is to be executed in the public computing facility,
      executing the further one of the components of the application at the public computing facility to generate third data; and
      combining the third data with the first and second data to generate the execution result of the application.

3. The method of claim 1, further comprising:
   in response to determining that a further one of the components is to be executed in the public computing facility,
      executing the further one of the components of the application at the public computing facility; and
      processing the received first or second data with the further one of the components at the public computing facility to produce the execution result of the application.

4. The method of claim 1 wherein determining the execution location includes:
   retrieving, from a data store in the public computing facility, a metadata file corresponding to the application, the metadata file including data identifying the individual components of the application and a corresponding execution location selected based on the data consumed by the individual components; and selecting the execution location for the individual components based on the data in the metadata file.

5. The method of claim 1 wherein:

the data includes a first type with a first importance level and a second type with a second importance level lower than the first importance level; and determining the execution location includes:

selecting the first or second local computing facility for executing the individual components when the individual components have the first importance level; and selecting the public computing facility for executing the individual components when the individual components have the second importance level lower than the first importance level.

6. The method of claim 1 wherein transmitting the request to execute the one of the components includes transmitting a request that identifies the one of the components, the data source from which the one of the components consumes data, and the first data to be transmitted from the one of the components to the public computing facility.

7. The method of claim 1, further comprising:

in response to determining that yet another one of the components is to be executed in a third local computing facility different than the first or second local computing facility, transmitting, from the public computing facility to the third local computing facility, another request to execute the yet another one of the components in the third local computing facility instead of the public computing facility, the first computing facility, or the second local computing facility; and receiving additional data from the yet another one of the components executed at the third local computing facility without having direct access from the public computing facility to another data source at the third local computing facility from which the yet another one of the components consumes data.

8. The method of claim 1 wherein:

the first data is a first model component;

the second data is a second model component; and combining the first and second data includes combining the first model component and the second model component into an overall model as the execution result of the application.

9. The method of claim 1 wherein:

the first data is a first model component developed by the one of the components via machine learning based on the data from data source at the first local computing facility;

the second data is a second model component developed by the another one of the components via machine learning based on the data from data source at the second local computing facility; and combining the first and second data includes processing, at the public computing facility, the first and second model components into an overall model without having direct access from the public computing facility to either the data source at the first local computing facility or that at the second local computing facility.

10. A computing device in public computing facility providing cloud services to a tenant and interconnected to a first local computing facility of the tenant and a second local computing facility of another tenant via a computer network, the computing device comprising:

a processor; and a memory operatively coupled to the processor, the memory having instructions executed by the processor to cause the computing device to:

upon receiving a command to launch an application with first and second components for the tenant at the public computing facility, determine an execution location for each of the first and second components, the execution location based on a type of data consumed by the each of the first and second components; and in response to determining that the first component is to be executed in the first local computing facility and the second component is to be executed at the second local computing facility, transmit, from the public computing facility to each of the first and second local computing facilities, a request to execute the first and second components in the first and second local computing facility, respectively; and subsequently, receive data from the first component executed at the first local computing facility and from the second component executed at the second local computing facility for consumption by other components of the application without having direct access from the public computing facility to data sources at the first and second local computing facilities from which the first and second components consume data.

11. The computing device of claim 10 wherein the memory includes additional instructions executed by the processor to cause the computing device to:

in response to determining that a third component of the application is to be executed in the public computing facility, execute the third component of the application at the public computing facility;

receive the data from the first and second components executed at the first and second local computing facilities, respectively; and processing the received data with the third component at the public computing facility to produce an output to the tenant.

12. The computing device of claim 10 wherein to determine the execution location includes to:

retrieve, from a data store in the public computing facility, a metadata file corresponding to the application, the metadata file including data identifying the individual first and second components of the application and a corresponding execution location selected based on the type of data consumed by the individual first and second components; and select the execution location for the individual first and second components based on the data in the metadata file.

13. The computing device of claim 10 wherein:

the type of data includes a first type with a first importance level and a second type with a second importance level lower than the first importance level to the tenant; and to determine the execution location includes to:

select the first local computing facility for executing the first component when the first component has the first importance level; and select the second local computing facility for executing the second component when the second component has the second importance level lower than the first importance level.

14. The computing device of claim 10 wherein the transmitted request identifies the first component, the data source from which the first component consumes data, and data to be transmitted from the first component to the public computing facility.

15. The computing device of claim 10 wherein:
the data from the first component is a first model component;
the data from the second component is a second model component; and
the method further includes combining the first model component and the second model component into an overall model as an execution result of the application.

16. The computing device of claim 10 wherein:
the data from the first component is a first model component developed by the first component via machine learning based on the data from data source at the first local computing facility;
the data from the second component is a second model component developed by the second component via machine learning based on the data from data source at the second local computing facility; and
the method further includes processing, at the public computing facility, the first and second model components into an overall model without having direct access from the public computing facility to either the data source at the first local computing facility or that at the second local computing facility.

17. A method for distributed application execution in a computing framework having a local computing facility of a tenant interconnected to a public computing facility via a computer network and separated by a security boundary, comprising:
receiving, from the public computing facility, a request to execute a component of an application for the tenant at the local computing facility, the request identifying execution result to be provided by the component to the public computing facility during execution of the component; and
in response to receiving the request from the public computing facility,
inspecting the identified execution result to be provided to the public computing facility at the local computing facility;
determining whether providing the execution result to the public computing facility violates a policy at the local computing facility; and
in response to determining that providing the data does not violate the policy,
executing the component of the application in the local computing facility to generate the execution result; and
forwarding the generated execution result from the component executed at the public computing facility to another component of the application executed at the public computing facility.

18. The method of claim 17 wherein the request identifies the component of the application, a data source from which the component consumes data, and the data to be transmitted from the component to the public computing facility.

19. The method of claim 17, further comprising:
in response to determining that the execution result does violate the policy, preventing or transforming the execution result from being forwarded to the another component executed at the public computing facility.

20. The method of claim 17, further comprising
in response to determining that the data does not violate the policy, creating a database record in the local computing facility to record an event corresponding to forwarding the data to the another component at the public computing facility.

* * * * *